United States Patent [19]

Snell

[11] 4,230,272
[45] Oct. 28, 1980

[54] CROP SPRAYING APPARATUS

[76] Inventor: Thomas B. Snell, Hill View, Penn La., Hardington Mandeville, Yeovil, Somerset, England

[21] Appl. No.: 913,158

[22] Filed: Jun. 6, 1978

[51] Int. Cl.² ............................................. A01G 25/02
[52] U.S. Cl. .................................. 239/121; 137/355.2; 239/164; 239/176; 239/178; 239/199; 239/709
[58] Field of Search ............... 239/120, 121, 124, 146, 239/159, 160, 164, 165, 172, 175–178, 184–190, 195–199, 212; 137/344, 355.12, 355.16, 355.2, 355.23; 242/86, 86.2, 86.3, 86.4

[56] References Cited

U.S. PATENT DOCUMENTS

| | | | |
|---|---|---|---|
| 1,014,521 | 1/1912 | Roddy | 137/355.2 X |
| 1,127,508 | 2/1915 | Pinckney | 239/199 X |
| 2,675,269 | 4/1954 | Rosene | 239/177 |
| 2,731,295 | 1/1956 | Snow | 239/165 X |
| 2,889,948 | 6/1959 | Leuenberger | 239/212 X |
| 2,896,858 | 7/1959 | Price | 239/212 |
| 3,899,132 | 8/1975 | Grobbelaar | 239/199 |

FOREIGN PATENT DOCUMENTS 389755  11/1973  U.S.S.R. ................................. 239/195

Primary Examiner—Andres Kashnikow
Attorney, Agent, or Firm—Andrus, Sceales, Starke & Sawall

[57] ABSTRACT

A crop spraying apparatus uses a flexible pipe that can be suspended clear of, and traversed over, the ground. The pipe has nozzles or apertures at intervals along its length. The pipe ends may be carried by tractors, one of which will have a pump for forcing the spray medium along the pipe and that tractor, or the other, will have a winch with a drum on which the pipe is wound. The winch is controlled to maintain the pipe tensioned and clear of the ground despite variations in the spacing between tractors. A fixed structure could replace one of the tractors.

12 Claims, 10 Drawing Figures

CROP SPRAYING APPARATUS

BACKGROUND OF THE INVENTION

This invention relates to spraying apparatus. It is particularly but not exclusively concerned with crop spraying, either with fertilizers, minerals, or with various killing agents, such as pesticides, insecticides, herbicides, and fungicides. These may be in liquid, dust or granule form. Seeds may be sown by such a system.

Tow mechanised crop spraying systems are generally known. One employs aircraft, the other a ground based vehicle such as a tractor. Fixed wing aircraft have to make 'runs' over the spraying area, which requires extreme accuracy of positioning and hazardous low level flying. There is a limit to the minimum height that can be safely flown, and there is a tendency for the sprayed medium to drift, causing double coverage of some spraying swathes, inadequate coverage or 'holidays' in others, or spraying of unwanted gases. This is wasteful and can be dangerous. Helicopters are more expensive to operate, their downdraught may interfere with the spray and can adamage fragible crops, and they have some of the drawbacks of fixed wing aircraft. In both cases the payload is limited and replenishment wasteful in time and fuel. All aerial spraying is governed much more rigorously by suitable weather conditions than is spraying from the ground.

The other common crop spraying system employs a tractor carrying or towing a tank of the spraying medium and fitted with a transverse boom (or a boom each side) with spray nozzles. This can only be of limited span, it tends to 'whip' on any but the smoothest ground, giving uneven spraying, and the manoeuvrability of the tractor in the corners of a field is restricted, often resulting in uneven treatment. Also, the tractor has to make a considerable number of passes to cover a given area, resulting in crop damage, reduced yield and soil compaction.

OBJECTS AND SUMMARY OF THE INVENTION

It is an object of this invention to provide a spraying system which substantially eliminates most of these drawbacks and which will product a uniform cover quickly, economically, and with minimum crop damage and soil compaction.

According to one aspect of the present invention there is provided spraying apparatus comprising a flexible pipe to be traversed over the ground and equipped with spray nozzles or apertures at intervals along at least some of its length, a storage device for such a pipe, means for suspending the pipe clear of the ground and for controlling the extent of pipe paid out from or taken in to said storage device and means for pumping spray medium along at least the said out portion of said pipe in use of the apparatus.

In one preferred form, the storage device is a reel or drum. The controlling means may include a reversible winch to turn the reel or drum in either direction as required. In another arrangement the storage device may be a pulley assembly having two sets of pulley wheels in an arrangement equivalent to a multifold purchase, the two sets being relatively movable to extend or retract the pipe which is rove around the pulleys. The controlling means may then be a hydraulic or pneumatic actuator to govern the sepration of the sets of pulley wheels.

The suspending means may include means for maintaining the pipe under substantially constant tension. Alternatively, the suspending means may include a flexible element, such as a wire, for spanning the same length of ground as the pipe, a second storage device for said element, means for controlling the extent of element paid out from or taken in to said second storage device, and means for attaching the paid out portion of said pipe to said element.

When the pipe is not fully paid out there will be nozzles or apertures on a length of the pipe wound on the storage device, and it is desirable to provide means for closing these off or at least coping with the excess spray medium. In a preferred arrangement the storage device is encased in a housing with a close fitting aperture for the pipe to enter. There will generally be means for recovering the spray medium and returning it to the pumping means or storing it. This housing is particularly important with some liquid sprays which tend to foam when released. The housing can be maintained almost full of the liquid, immersing the drum or other storage means, and the liquid escaping through the nozzles of apertures will not meet air and will therefore not foam.

In some applications it will be important to keep the nozzles or apertures pointing downwards or in other preferred directions. Means can be provided to do this provided the pipe is not of uniform circular cross-section throughout. The nozzles can be used to engage a recessed wheel as they enter the housing, and thereby maintain correct pipe orientation.

According to another aspect of the invention there is provided a spraying system including apparatus as defined above carried by a vehicle and supporting means, with the paid out portion of the pipe spanning the ground between the vehicle and the supporting means. The supporting means may be another vehicle or a fixed structure. The apparatus will preferably be mounted principally on the side of the or each vehicle opposite the pipe span. Either of the vehicles can be adapted for towing and the system may include a trailer equipped with a tank carrying said spray medium.

The foregoing as well as other objects and features of the present invention will become more apparent upon consideration of the following detailed descriptions when taken in conjunction with the drawings.

DETAILED DESCRIPTION OF THE ILLUSTRATED EMBODIMENT

Figure 1:
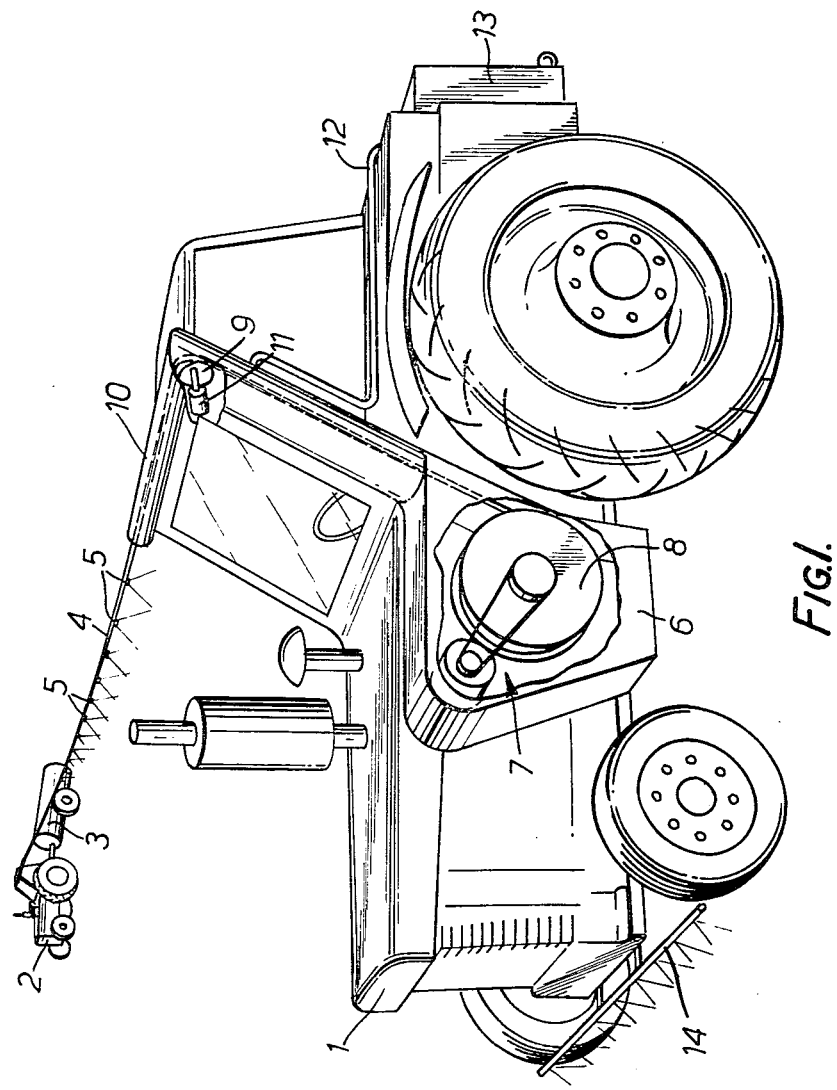
FIG. 1 is a perspective view, with parts cut away, of a spraying system using apparatus according to the invention.

The system shown in FIG. 1 employs two tractors 1 and 2, one of which tows a tank 3 of spray medium. The tractors are linked by a pipe 4 with nozzles 5 along its length for spraying the ground between the two tractors. Instead of nozzles, there may simply be apertures. The tractor 2 towing the tank 3 is equipped with a pump (not shown) on the side remote from the tractor 1, to force the spray medium along the pipe.

The tractor 1 carries at the side remote from the tractor 2 a housing 6 which contains a reversible winch 7. The pipe 4 is led to the winch drum 8 over a pulley 9 at an elbow in an L-shaped conduit 10 which effectively extends the housing 6 up and over the cab roof. The entry for the pipe to the conduit 10 is through a close fitting aperture (not shown). The pulley 9 has a hydraulic, pneumatic or mechanically sprung suspension indicated by reference 11 from which can be detected the tension in the pipe 4. This information can be used to govern the operation of the winch 7 so that the pipe is paid out or taken in as the tension increases or decreases. A separate 'jockey' pulley could be used for this tension control. Obviously tension has to be greater the more widely spaced the tractors, in order to keep the pipe 4 clear of the ground. But generally the tractors will be driving substantially parallel courses and so a constant tension for that spacing is required.

If the spacing does alter, this can be determined for example by the amount of pipe paid out, and the consequent optimum tension can be adjusted accordingly.

It will be appreciated that to spray a swathe, the tractors 1 and 2 are coupled by the pipe as illustrated and driven forward in parallel, with the spray medium being pumped along the pipe from the tractor 5. Exact parallelism is not necessary. Indeed one of the advantages of the system is that vehicles can diverge and converge according to the shape of the field. While as large a span as possible will normally be sprayed in one pass, this may not use all the pipe 4 available. There will be a length left on the drum 8 within the housing 6, spraying through nozzles 5. However, the housing 6 is substantially closed and therefore the spray medium will be collected in it. This excess spray medium, if liquid, may be maintained at a level in the housing above the drum so that the nozzles are immersed, and therefore will not produce foaming. Obviously, as spraying continues this excess spray medium will increase and will have to be stored elsewhere. This can be done by leading it via overflow duct 12, a reserve tank 13 on the tractor as illustrated or a trailer similar to wheeled tank 3. It is also possible to use some of the excess spray medium for a spray bar 14 fitted to the tractor.

Figure 2:
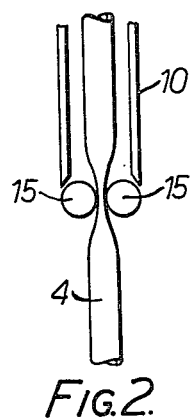
FIG. 2 is a diagrammatic detail of a pipe lead arrangement for the system of FIG. 1.
Figure 3:
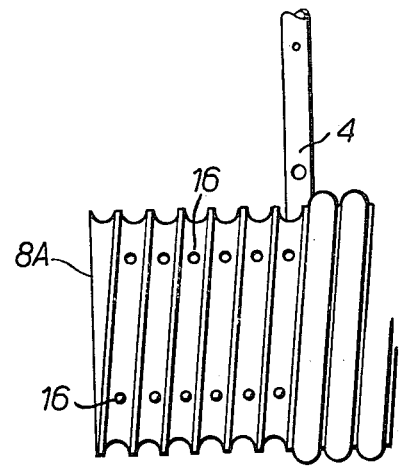
FIG. 3 shows a winch drum for the system of FIG. 1.

To reduce or even eliminate spray medium reaching the portion of the pipe on the drum 8, the pipe could be fed through pinching rollers 15 at the entry to the conduit 10 as indicated in FIG. 2. This would probably be suitable only if there were apertures rather than nozzles. Another way of reducing spraying inside the housing 6 is shown in FIG. 3, where a helically grooved drum 8A has individual seats or plugs 16 for the nozzles or apertures which close off the latter as the pipe is wound on the drum.

Figure 4:
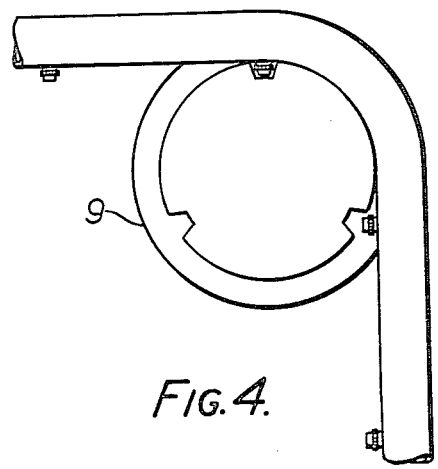
FIG. 4 shows a guide wheel adapted to maintain correct orientation of a pipe in the system of FIG. 1.
Figure 5:
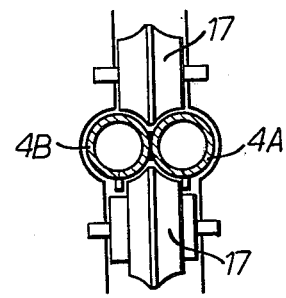
FIG. 5 shows another guide means adapted to maintain correct orientation of the pipe in the system of FIG. 1.

It will be advisable in most cases to maintain the nozzles with a definite orientation, usually downwards. The end of the pipe at the tractor 2 can readily be fixed, and therefore it is principally a matter of ensuring that the other end leads onto the winch drum correctly. If the nozzles are frequent and project a significant amount they can be used as studs to engage with a matching recessed guide wheel, which may be pulley 9 as shown in FIG. 4. Obviously care must be taken to avoid the jet orifices being damaged. Another method of maintaining the pipe in the desired attitude is to have it of non-circular section and feeding through a matching guide on the tractor 1. In one version of this, shown in FIG. 5, there are two side by side pipes 4A, 4B welded or otherwise connected together throughout their length to give a figure-of-eight cross-sectional shape, which can readily be kept at the correct orientation by means of guide rollers 17. Both pipes may have nozzles or simple apertures for the spray medium.

Figure 6:
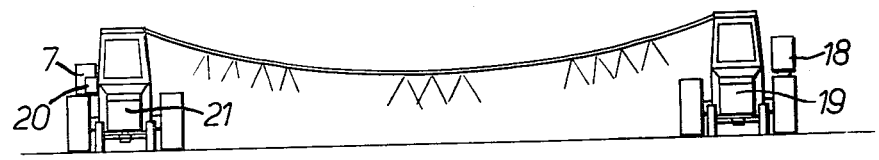
FIG. 6 is a rear end view of a slightly modified spraying system in use.

Instead of having the pump on one tractor and the winch on the other, they can both be fitted on the same vehicle, which would have at least some of this equipment on the outboard side to counterbalance the tension in the pipe. The other tractor would also need some outboard counterbalance. These balancing means may be made adjustable either by mechanically moving weights or pumping liquid between tanks 18 and 19 as shown diagrammatically in FIG. 6. With the spray medium pump 20 adjacent the winch 7 it will be necessary to feed the spray medium through a rotating hose coupling to the pipe on the drum. The spray medium issuing from the nozzles still within the winch housing can be collected and returned to the supply tank 21, which in this example is carried on the vehicle equipped with the pump rather than on a trailer. It can thus assist the counterbalancing.

Figure 7:
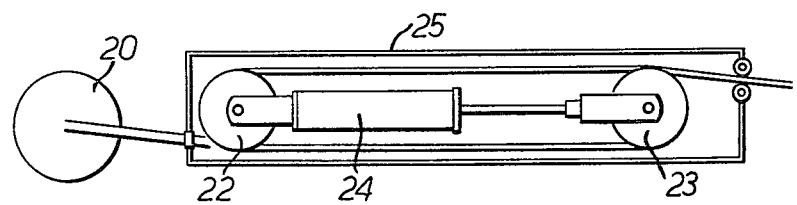
FIG. 7 is a side view of a pipe storage and tensioning device.

Instead of winding the pipe onto a winch drum or reel, it may be passed around two sets of pulleys 22, 23, in the manner of a multifold purchase, as shown in FIG. 7. One set will be fixed, apart from being rotatable, and the other set will be mounted for movement towards and away from the first set. This movement may be achieved by hydraulic, pneumatic or mechanical means, here illustrated by pressure fluid actuator 24. The pipe 4 is fixed at one end, to the pump 20 for example, and by virtue of its traversal of the pulleys, the other end will be paid out or drawn in accordingly as the pulleys are moved together or apart. Again, this assembly will be contained in a housing 25 for recovery of excess spray medium.

Figures 8A, 8B:
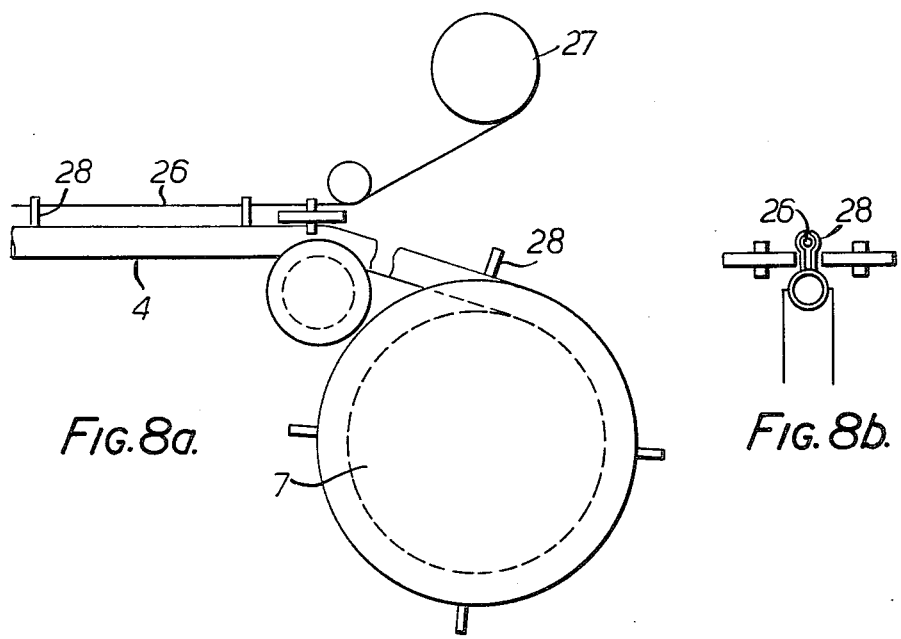
FIGS. 8a and 8b illustrate a wire-supported pipe.
Figure 9:
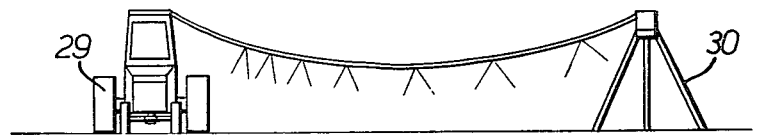
FIG. 9 is a perspective view of a further modified spraying system in use.

The pipe may be self supporting or carried by a wire kept under tension between the two vehicles. The self supporting pipe will preferably be of nylon reinforced plastics material, possibly with a braided sheath, and of small bore (and therefore reduced weight) for high pressure spraying. The pipe supported by wire is also preferably suited for high pressure spraying. It is partially illustrated by FIGS. 8a and 8b. The pipe 4 and wire 26 will be wound on separate winches 7 and 27, preferably on the same vehicle, and the pipe will be equipped with means such as snap-on clips 28 for automatic attachment to and detachment from the wire as the vehicles diverge and converge.

There will inevitably be a certain sag in the pipe, with the result that nozzles or apertures at the middle of the span are nearer the ground. They will usually spray in cones or fans, and this may give slightly uneven spraying. Therefore nozzles with different or adjustable settings, or apertures of graded sizes, may be provided along the length of the pipe, or the nozzle or aperture spacing may be non-uniform, to compensate for this, as shown in FIG. 4. It is preferred to have nozzles with adjustable settings for they can be set to an optimum for a particular swathe. It will generally be convenient, when spraying a large area, to cover it in swathes of substantially uniform width, and if possible this width is selected so that an integral multiple of it equals the width of the field. No nozzle re-adjustment will then be necessary. It will not matter in most circumstances if the swathes are not exactly parallel-sided; minor lateral diversions of either tractor will not significantly imbalance the spraying density.

The pipe or wire will have a controlled tension but should this increase above a pre-determined level, some protection is required. Therefore, they may be provided automatic quick release means designed to act some time before the breaking strain of the pipe is reached. This may be at the fixed non-winch end of the pipe, or the winch may have a clutch designed to slip at a given torque. Both such safety means may be provided, and if either function they can be arranged automatically to stop the pump.

The vehicle with the pump may either tow a quickly detachable tank trailer or carry a tank, as described with reference to FIGS. 1 and 6. This tank may contain water or other dilutant to be mixed in the pump with the spray medium in concentrate form, which will be carried by a separate, smaller tank on the vehicle. Whether carried or towed, concentrated or diluted, the spray medium may require constant or regular agitation, and this can be achieved mechanically by immersed paddles for example, or hydraulically by a pump. The spray medium may be powder or granules, in which case a blower rather than a pump constitutes the means for injecting it into the pipe.

It will be understood that the controls for this equipment will be mounted in the cab or cabs of the vehicles, for operation by the drivers.

The number of passes per field will be greatly reduced compared with boom spraying. The spray limits will be clearly indicated by the wheel marks (the tractors may be fitted with spray bars 14 their own width to give complete coverage) and so the system is self-marking. Normal tractors can be used and setting-up, operation, movement from field to field and closing down are quite simple.

In a modification as shown in FIG. 9, there is one vehicle 29, while the other vehicle is replaced by a fixed structure 30 around which the vehicle 29 can traverse, thereby to spray circular or other areas defined by a closed curve. In this case, the pipe nozzles or apertures should be adjusted to give progressively reduced volume spray jets towards the fixed structure to compensate for the relatively slow motion of the pipe near that structure.

Although it will normally be preferred to mount as much as possible of the apparatus on the outboard side of the or each tractor, it may be more convenient to mount it on the rear or even on the inboard side and ballast the outboard side as necessary. The lead for the pipe would then be simpler, and could be lower than shown in the FIGS. 1 and 5, thus reducing the tipping moment. Although shown leading over the cab roof, it will be understood that with an outboard mounting the pipe could be led elsewhere, for example just over the bonnet or around the rear of the cab.

I claim:

1. Spraying apparatus comprising a flexible pipe equipped with spray issuing means at intervals along at least some of its length, a storage device for such a pipe including a pulley assembly having two sets of pulley wheels in an arrangement equivalent to a multifold purchase, the two sets being relatively movable to pay out or take in the pipe which is passed around the pulleys wheels, means for suspending the pipe clear of the ground, means for controlling the extent of pipe paid out from or taken into said storage device, and means for pumping spray medium along at least the paid out portion of said pipe in use of the apparatus, the suspending means including, at one end of the pipe at least, a vehicle movable transversely to the length of the suspended pipe whereby the ground can be swept by the spray medium 2. Spraying apparatus comprising a flexible pipe equipped with spray issuing means at intervals along at least some of its length, a storage device for such a pipe, means for suspending the pipe clear of the ground, means for controlling the extent of pipe paid out from or taken into said storage device, and means for pumping spray medium along at least the paid out portion of said pipe in use of the apparatus, said suspending means for said pipe including a flexible element for spanning the same length of ground as the pipe, a second storage device for said element, means for controlling the extent of element paid out from or taken into said second storage device and means for attaching the paid out portion of said pipe to said element, said suspending means further including, at one end of the pipe at least, a vehicle movable transversely of the length of the suspending pipe whereby the ground can be swept by the spray medium.

3. Spraying apparatus comprising a flexible pipe equipped with spray issuing means at intervals along at least some of its length, a storage device for such pipe, said storage device being enclosed in a housing with a close-fitting aperture for the pipe, means for suspending the pipe clear of the ground, means for controlling the extent of pipe paid out from or taken into said storage device, means for pumping spray medium along at least the paid out portion of said pipe in use of the apparatus, and means provided in said storage device housing for recovering spray medium from said housing and returning it to said pumping means, the suspending means including, at one end of the pipe at least, a vehicle movable transversely to the length of the suspended pipe, whereby the ground can be swept by the spray medium.

4. Apparatus as claimed in claim 1, 2, or 3, wherein said storage device is a reel or drum.

5. Apparatus as claimed in claim 1, 2, or 3, wherein the controlling means includes a reversible winch.

6. Apparatus as claimed in claim 1, 2, or 3, wherein the suspending means includes means for maintaining the pipe itself under tension.

7. Apparatus as claimed in claim 1, 2, or 3, and including means for maintaining the nozzles or apertures with a desired orientation.

8. Apparatus as claimed in claim 1, 2 or 3, wherein the nozzles are adjustable or the apertures are of graded sizes.

9. Apparatus as claimed in claim 1, 2, or 3, wherein said vehicle is adapted for towing, and including a trailer equipped to carry said spray medium.

10. Apparatus as claimed in claim 1, 2 or 3, wherein said suspending means includes another vehicle at the other end of the pipe.

11. Apparatus as claimed in claim 1, 2 or 3, wherein said suspending means includes a fixed structure at the other end of the pipe.

12. Apparatus as claimed in claim 1, wherein the controlling means includes a pressure fluid actuator to govern the separation of said sets of pulley wheels.

* * * * *